F. S. CARR.
FASTENER.
APPLICATION FILED AUG. 10, 1917.

1,278,799.

Patented Sept. 10, 1918.

Inventor:
Fred S. Carr.
by Emery Booth Janney Varney
Attys.

UNITED STATES PATENT OFFICE.

FRED S. CARR, OF CAMBRIDGE, MASSACHUSETTS, ASSIGNOR TO CARR FASTENER COMPANY, OF CAMBRIDGE, MASSACHUSETTS, A CORPORATION OF MAINE.

FASTENER.

1,278,799.

Specification of Letters Patent.

Patented Sept. 10, 1918.

Application filed August 10, 1917. Serial No. 185,601.

*To all whom it may concern:*

Be it known that I, FRED S. CARR, a citizen of the United States, and a resident of Cambridge, county of Middlesex, Commonwealth of Massachusetts, (whose post-office address is care of Carr Fastener Company, Cambridge, Massachusetts,) have invented an Improvement in Fasteners, of which the following description, in connection with the accompanying drawings, is a specification, like characters on the drawings representing like parts.

This invention pertains to improvements in fasteners, and more particularly, though not exclusively, to improvements in snap fasteners adapted for use in connection with automobile curtains, cartridge belts, and for any purpose in which it is desirable to securely attach two elements together while providing for facile relative detachment thereof.

Among the objects of the invention are to provide a snap fastener of very strong and durable yet simple and inexpensive construction, readily separable yet having great structural strength to resist accidental or improper separation of the parts.

In the drawings:—

Figure 1:
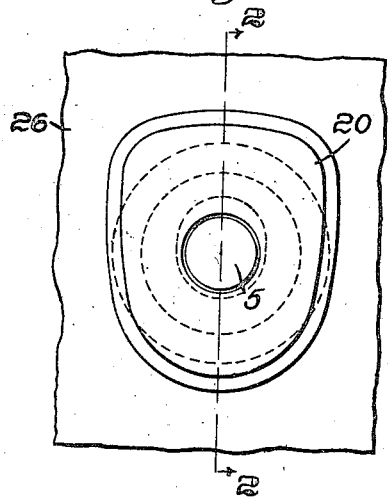
Figure 1 is a front elevation of a preferred form of fastener selected for illustrative purposes.

Referring to the drawings and to the preferred form of my invention selected for illustrative purposes, I have shown a stud and socket fastener comprising a stud 4, preferably provided with a head 5 and preferably provided with a neck having a rounded shoulder 7. The stud 4 is shown attached to fabric 8 by prongs 9 extending through a plate 10.

Figure 2:
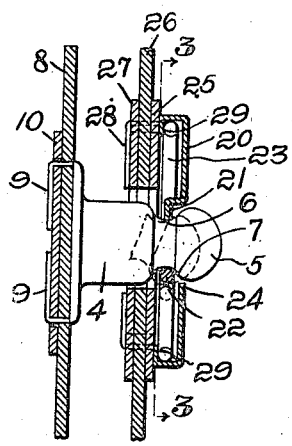
Fig. 2 is a vertical section thereof on line 2—2 of Fig. 1.

In so far as I am at present aware, no one has ever before provided a stud and socket fastener having a rounded shoulder which could not be disengaged by a sufficiently strong rectilinear relative pulling apart of the stud and socket. It is among the objects of this invention to provide a socket which, when coöperating with a stud having a rounded shoulder, cannot be separated from the stud without a relative tipping movement. I preferably limit this tipping movement to one direction so that, for instance, (Fig. 2) the socket can only be separated from the stud by an outward pull on the lower portion of the socket. It is of course obvious that corresponding relative movement may be obtained by similarly moving the stud in the opposite direction. Another object of the invention is to provide a stud and socket fastener having a positive jaw coöperating with a yielding jaw so that the strain is taken by the solid or fixed jaw rather than by the yielding jaw, and of such construction that when the socket is in the proper relative position to the stud, separation of socket and stud can only be produced by a tipping movement, even if the spring jaw were removed.

Figure 3:
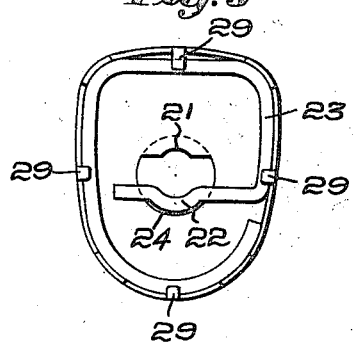
Fig. 3 is a section on the line 3—3 of Fig. 2, the stud being omitted.

In the illustrative socket I have provided a front casing 20 having a portion thereof stamped out to provide an aperture for the head of the stud, and a portion of what is usually stamped out for such aperture pressed inwardly to provide fixed jaw 21 opposite a yielding jaw 22, which may be and preferably is in the general form shown as 23 in Fig. 3. The fixed jaw 21 and the yielding jaw 22 are preferably substantially opposite one another, and the relation between the fixed jaw 21 and the rim 24 of the aperture in the front plate 20 opposite the fixed jaw are preferably so positioned relative to each other and relative to the head of the stud that a direct rectilinear pulling apart of the socket and stud will result in one side of the shoulder of the stud catching on the fixed jaw 21, while the other side of the stud on or beyond the shoulder will abut on the rim 24 of the front plate 20. I may and preferably do also position the fixed jaw relative to the aperture in the plate 20 and relative to the head of the stud so that any tipping movement transversely of the fixed jaw 21 will bind the stud between the sides of the fixed jaw and the aperture in the front casing, thereby preventing removal thereof independently of the spring. In what I believe to be the best form of my invention as shown in the drawings, the stud and front plate of the socket are therefore only separable by relative tipping movement in one direction even without the coöperation of the back plates of the socket, which preferably have a guiding and limiting function, and which are preferably adapted to relieve the front plate 20 of a considerable proportion of the strain placed thereon by a tipping movement in an undesired direction. When the stud and socket are tipped apart at the bottom viewing Fig. 2, however, the spring jaw may yield and ride over the curved camlike part of the head so as to permit the two elements to be separated.

I have shown the front plate 20 attached to an intermediate plate 25, fabric 26 and back plate 27 by prongs 28, preferably integral with the front plate 20. While I have shown the prongs 29 (Fig. 3) as closed on the spring 23 and not passing through the intermediate plate 25, I may, if desired, provide suitable apertures in the plate 25 and bend the prongs on the back side of the plate 25, thereby clamping the front plate, spring and back plate together prior to the closure of the prongs 28. The intermediate plate 25, fabric 26 and back plate 27 are preferably pierced by a hole slightly larger in diameter than the enlarged shank of the stud 4, the enlarged portion of such shank extending within the aperture. The aperture is preferably centric and round, and of just sufficient size to permit the tipping operation in the desired direction.

It is obvious that, under some conditions, what I have referred to as the front plate may become a back plate, as where the invention disclosed is used in connection with fasteners of that type in which the socket is entirely located, aside from its attachment means, on the inside of the fabric. It is also obvious that the fixed jaw 21 may, if desired, be formed on the intermediate plate or on an entirely separate plate. The fixed jaw is preferably always located at the top of the fastener, because it is for most purposes more convenient to lift the bottom portion of the plate than to pull down the upper portion.

It is also clear that the aperture of the front plate 20 may take various forms, in some of which merely an indent and not a hole would be provided.

While for illustrative purposes I have shown and described one embodiment of my invention, it is obvious that changes involving omission, substitution, alteration and reversal of parts, and even changes in the mode of operation, may be made without departing from the scope of my invention, which is best defined in the following claims.

Claims:

1. A stud and socket fastener comprising, in combination, a stud having a head providing a sloping shoulder and a socket providing opposed jaws, one resilient, the other fixed, positively opposing rectilinear withdrawal of said stud from said socket, while permitting withdrawal thereof when said stud and socket are tipped one relative to the other.

2. A stud and socket fastener comprising, in combination, a stud having a head providing a sloping shoulder, said stud being symmetrical throughout the socket engaging portion thereof, and a socket providing opposed jaw means including a fixed jaw positively opposing rectilinear withdrawal of said stud from said socket while permitting withdrawal thereof when said stud and socket are tipped one relative to the other.

3. A stud and socket fastener comprising, in combination, a stud having a head providing a sloping shoulder and means including a fixed jaw and a coöperating opposed yielding element positively opposing rectilinear withdrawal of said stud from said socket while permitting withdrawal thereof when said stud and socket are tipped one relative to the other.

4. A stud and socket fastener, comprising in combination, a stud having a neck and a head, a socket providing a fixed jaw and an opposed yielding jaw and said socket having provision opposing relative tipping movement of said stud and socket in all directions except that direction providing for disengagement of the head of said stud from said fixed jaw against the resilient resistance of said yielding jaw.

5. A stud and socket fastener comprising, in combination, a stud providing a neck and a head, a socket providing a casing, a fixed jaw having an arcuate portion for engagement with the neck of said stud, a spring jaw opposite said fixed jaw and having a neck engaging portion, said casing providing strain-receiving stop means protecting said spring jaw from substantial strain and substantial movement except on relative tipping movement of said stud and socket in a direction transverse to and away from said spring jaw.

6. A stud and socket fastener providing a stud having a neck and a head providing a sloping shoulder in combination with a socket comprising a front plate and a back plate, a fixed jaw for entrance into the neck of said stud and for engagement with said rounded shoulder, said front plate having an aperture therethrough for the receipt of the head of said stud and providing a stop opposing movement of said stud in a direction away from said fixed jaw unaccompanied by tipping relative movement of said stud and socket.

7. A stud and socket fastener providing a stud having a neck and a head in combination with a casing having a front plate providing a fixed jaw pressed inwardly therefrom, a spring jaw opposed to said fixed jaw, said stud having a sloping shoulder for engagement with the fixed jaw to oppose rectilinear withdrawal of the stud from the socket and for engagement with the spring jaw to move said spring jaw away from the fixed jaw on relative tipping of stud and socket to permit withdrawal of the stud from the socket.

8. A stud and socket fastener providing a stud having a neck and a head in combination with a casing providing a fixed jaw, a spring jaw opposed to said fixed jaw, said stud having a sloping shoulder for engagement with the fixed jaw to oppose rectilinear withdrawal of the stud from the socket and for engagement with the spring jaw to move said spring jaw away from the fixed jaw on relative tipping of stud and socket to permit withdrawal of the stud from the socket.

9. A stud and socket fastener providing a stud, symmetrical in cross section, having a neck and a head in combination with a casing having a front plate providing a fixed jaw pressed inwardly therefrom, a spring jaw opposed to said fixed jaw, said stud having a sloping shoulder for engagement with the fixed jaw to oppose rectilinear withdrawal of the stud from the socket, and for engagement with the spring jaw to move said spring jaw away from the fixed jaw on relative tipping of stud and socket to permit withdraw of the stud from the socket.

10. A stud and socket fastener comprising, in combination, the stud 4 having the head 5 and the neck 6, said head and neck providing a sloping symmetrical shoulder 7; a socket comprising a fixed jaw 21 and an opposed spring jaw 22.

11. A stud and socket fastener comprising, in combination, the stud 4 having the head 5 and the neck 6, said head and neck providing a sloping symmetrical shoulder 7; a socket comprising a fixed jaw 21 and an opposed spring jaw 22, and a coöperating stop surface 24 for engagement with the head 5 of the stud 4 to prevent undue strain of the jaw 22, while permitting the rounded shoulder 7 of the head 5 of the stud to wedge the spring jaw 22 away from the fixed jaw 21 when the stud and socket are tipped one relative to the other in a direction away from the spring jaw 22.

12. A stud and socket fastener comprising a headed stud, a socket having an aperture to receive the stud presenting adjacent one side thereof a rigid jaw adapted to engage behind the head, said socket carrying an opposed yielding jaw to engage said stud, one of said last mentioned engaging elements having a gently inclining cam-like surface along which the other may ride when the stud and socket are tipped apart on that side.

13. A fastener as defined in claim 12 wherein said rigid jaw is formed by an extension of the socket wall offset to lie substantially coplanar with said yielding jaw.

14. A stud and socket fastener comprising a stud having a head with gently sloping shoulder portions, a socket having a stud-receiving aperture, a rigid jaw adjacent said aperture having an edge extending secant-like across one side of the same, a yielding jaw opposing said rigid jaw, said aperture being proportioned to engage the shank of said stud on the side opposite said rigid jaw, when the latter is disposed behind the head thereof.

In testimony whereof I have signed my name to this specification.

FRED S. CARR.